United States Patent [19]
Ray et al.

[11] Patent Number: 5,557,656
[45] Date of Patent: Sep. 17, 1996

[54] MOBILE TELECOMMUNICATIONS FOR AIRCRAFT AND LAND BASED VEHICLES

[75] Inventors: Jimmy C. Ray, Denison; Robert L. George, II, Plano; Richard C. Levine, Richardson, all of Tex.

[73] Assignee: AirCell, Inc., Dallas, Tex.

[21] Appl. No.: 847,920

[22] Filed: Mar. 6, 1992

[51] Int. Cl.⁶ .................................................. H04Q 7/22
[52] U.S. Cl. ....................... 379/59; 379/60; 455/33.1; 455/33.2; 343/890
[58] Field of Search .................... 379/58, 59, 60; 455/12.7, 13.1, 33.1, 33.2, 33.3, 56.1; 342/36, 38, 350, 351, 352, 357, 385–389, 450, 451; 343/713, 741–742, 757, 797, 876, 890, 891

[56] References Cited

U.S. PATENT DOCUMENTS

| | | | |
|---|---|---|---|
| 4,249,181 | 2/1981 | Lee | 455/33.3 |
| 4,868,577 | 9/1989 | Wingard | 343/713 |
| 5,123,112 | 6/1992 | Choate | 455/33.2 X |
| 5,189,734 | 2/1993 | Bailey et al. | 455/33.2 |
| 5,204,970 | 4/1993 | Stengel et al. | 455/69 |
| 5,214,789 | 5/1993 | George | 379/60 X |
| 5,235,633 | 8/1993 | Dennison et al. | 379/60 |

FOREIGN PATENT DOCUMENTS

| | | | |
|---|---|---|---|
| 2216319 | 10/1989 | United Kingdom | 379/61 |

OTHER PUBLICATIONS

ETSI b5MZ, Ronneby, 9–1991, "Idle Mode Cell Reselection for Microcells".

"Skycell Service asks Spectrum, Claims Better Air-to-Ground Service", Mobile Sattelite Reports, vol. 4, No. 1, Apr. 1990.

*Primary Examiner*—Curtis Kuntz
*Assistant Examiner*—G. J. Oehling
*Attorney, Agent, or Firm*—Wendell Coffee

[57] ABSTRACT

Aircraft communications are established on a cellular system by having the transmission to aircraft directed above ground level so as not to interfere with ground cellular systems and having the transmissions from the aircraft at extreme low power levels so as not to interfere with transmissions from ground vehicles. The location of mobile stations either aircraft or ground vehicles for one embodiment is determined by Loran reception or other radio navigation system in the mobile station and transmitted to a mobile switching center to be used in transferring control from cell to cell by use of the determined location of the mobile station. For another embodiment the antennae for aircraft (both base station and mobile) are horizontally oriented while ground vehicle antennae (both base station and mobile) are vertical as in present commercial practice.

5 Claims, 3 Drawing Sheets

MOBILE TELECOMMUNICATIONS FOR AIRCRAFT AND LAND BASED VEHICLES

RIGHTS TO INVENTIONS UNDER FEDERAL RESEARCH

There was no federally sponsored research and development concerning this invention.

CROSS REFERENCE TO RELATED APPLICATION

None.

BACKGROUND OF THE INVENTION (1) Field of the Invention

This invention relates to mobile telecommunications and more particularly to communications which are automatically relayed to mobile stations from ground station to ground station according to the cellular system. Also specifically all systems described are suitable for aircraft.

(2) Description of the Related Art

This invention is described in relation to North American cellular systems. However, its teachings are equally applicable to other cellular systems such as GSM, NMT, and others used in Europe, Japan, and other countries.

North American cellular radio telephone service, primarily for automobiles or other land vehicles, currently uses a designated plurality, namely a set of 832 radio channels in the Ultra High Frequency (UHF) radio band. As used here, "channel" means a pair of Ultra High Frequencies in the designated band. One frequency of the pair in a channel is called the "forward" carrier used for transmission from the base to the mobile, and the other frequency of the pair in the channel is used for transmission in the "reverse" direction from the mobile to the base. Two competitive operators in each service area each use 416 channels. North American cellular standards are also widely used in other countries. At this time, most Latin American countries which have cellular service use equipment conforming to North American standards, sometimes called "AMPS" after the original AT&T project name "Advanced Mobile Phone Service." AMPS standard systems are also in place in Australia, New Zealand, Israel, Korea, and several other southeast Asian countries. Present technology utilizes analog Frequency Modulation as the method for transmitting the speech, with a 30 kHz frequency channel spacing. Digital technology will be introduced commercially in 1992. In early 1992 compatibility testing is in progress to ensure inter-operability between various vendors' base and mobile equipment. Digital cellular permits the combining of three conversations from three different mobile subscribers onto the same 30 kHz bandwidth radio carrier. Future planned technical improvements in digital cellular will lead to the combination of six different conversations on the same radio carrier.

Cellular systems allow more conversations simultaneously in the same service area (e.g., city) than there are channels, because the radio channels are "re-used" at several different base radio locations in the overall service area. The cellular system divides up the service area into a number of cells. Each cell includes a base transmission station or tower. The radius of the cell will be basically the distance from the base tower that good reception is assured between the tower and the mobile station which is sometime referred to as the land effective transmission range. Therefore, it may be seen that if the entire area is covered by the numerous cells, then the arrangement of the cells is often considered to be somewhat like hexagonal tiles covering the entire service area, however, it will also be understood that there is a border area between two cells where transmission and reception are about equal, or if not equal, are acceptable from either of two or three different base stations (sometimes called towers herein). The cell diameter would be approximately twice the cell radius which would be the distance of dependable transmission and reception. A widely used typical layout includes seven "cells," wherein a fraction of the total radio channel numbers can be used in each cell. Other arrangements are also used, but this discussion will describe the seven cell example to specific.

In a completely set-up system, there are 416 radio channels available for each of the two competing operators in a service area (e.g., in Dallas-Fort Worth, Metrocell has 416 channels and Southwestern Bell Mobile Systems has another 416). Of these 416, 21 are reserved for sending call processing messages (or control) only and are not used for voice. The remaining 395 channels, called, then the are divided into seven groups of approximately 56 channels each when used with a seven cell layout plan.

It will be understood that with a group of seven cells, any particular tower would be less than three radii in distance from about $2/3$ of the mobile stations in other cells, and therefore potentially interfering. However, it will also be understood that with seven cells there would be one center cell with six other cells grouped around it. If additional cells were added it will be understood that mobile stations in each additional cell could be spaced at least more than five radii distant from any cell base station using the same channel; and therefore in a location where the potentially interfering signal strength would be very weak. Therefore the additional cell base stations could use the same radio channel as the cell whose border was more than five radii away.

Each cell represents the coverage area of a different base station antenna, based on radio signal power compared to interference from other base stations in the city using the same radio channels. For FM radio with 30 kHz bandwidth, it is known from extensive testing that the effective operational boundary of a cell is determined by the approximately circular boundary where the desired radio signal is stronger than the interference from other cells by a ratio of approximately 64 to 1. In radio jargon, this ratio is usually expressed by means of the logarithm of the power ratio, and is thus 18 decibels (dB). Real cells are often far from circular in shape due to irregularities in terrain, the effect of buildings and trees, etc. Other arrangements of the radio channels, using directional antennas rather than the omni-directional (circular pattern) cells are also used in some areas with very high subscriber densities. In the outermost cells of a service area, where there are no other cells beyond the edge of the service area, the outer perimeter of an individual cell is determined by the locations where the signal strength is 18 dB stronger than the interfering radio "noise" level in the receiver due to irreducible physical and device electrical random "noise."

The actual diameter of the cells in real systems, depending upon antenna height and base station radio transmitter power, varies by design from as little as about 5 km (3 mi) to as much as about 40 km (25 mi). The objective when designing an effective cellular system is to ensure that interfering radio signals on the same radio frequency throughout each cell remain weaker than the desired signal by this ratio of 18 dB.

Each cell contains a radio channel for control messages (called a setup or a control channel) in addition to the voice conversation channels referred to above. The control channels are generally taken from the pool of 21 channels legally reserved for that purpose. When a call is initiated, a sequence of special digitally coded messages are exchanged between the base and mobile radios on the control channel to locate and identify the mobile subscriber, and to determine what telephone number the mobile subscriber dialed when the call is originated by the mobile subscriber. The last message of the sequence directs the mobile radio to re-tune to an available voice channel for the purpose of conversation. During the conversation, the voice channel may be very briefly interrupted to transmit messages between the mobile and the base. These brief interruptions (typically only two tenths of a second and typically called "packets" or "information packets") cause minor, often unnoticed, interruptions of the speech. The major reasons for sending such messages from the base to the mobile radio are to remotely control the mobile radio transmit power and to change the mobile radio frequency channel when required for a handoff.

The mobile transmitter power must be controlled because the mobile transmitter needs to put out more radio frequency power to reach the base station receiver with a strong signal when it is at the outer boundary of a cell than when it is near the base receiver antenna at the center. Lower power is used at or near the center of the cell to prevent excessive interference with other cells. As a mobile moves from the center of a cell to the outer perimeter, the base may command it to increase power in as many as eight steps, designated as Power Levels zero through seven (PL0 through PL7), with PL0 being the maximum.

Consider the station when the mobile approaches the outer perimeter of the cell. The radio signal received at the base station will decrease still more when the mobile set moves further away, and if the mobile transmitter is already set at PL0, the signal level cannot be increased any further by increasing the mobile transmitter power. At this point it is usual to begin a handoff process. First the base system causes a tunable "locating receiver" in each of the six neighboring cell base stations to tune to the mobile transmitter frequency of the mobile which has reached the handoff radio signal strength level. The measurements of radio signal strength in the six neighboring cells are compared, and the strongest one is chosen as the handoff target cell. If there is an available voice channel in that cell, the mobile unit is sent a command message to re-tune to that frequency, and simultaneously the voice connection is switched over to the proper radio channel base unit in the target cell by means of a special central telephone exchange switch which is connected to all the cells and also connected to the public telephone network. This special switch is known as a Mobile Switching Center (MSC) or a Mobile telephone Switching Office (MTSO).

At the present time, the use of cellular mobile stations in aircraft in flight is not generally feasible. The major problem is the high level of interference which the mobile set can cause to numerous cells in a city when it operates in an aircraft. This problem and the invention to overcome this problem is explained further below.

Modern aircraft are provided with many electronic aids and devices. For example, a large percentage of aircraft are provided with Loran reception and locators. This technology is well known, so that with simple computers or microprocessors the location of the aircraft may be pinpointed.

Also, certain ground located computers with the addition of weather information can locate adverse weather such as thunder storms and for any given predetermined flight plan, can advise the aircraft of alternate flight plans to avoid severe weather. Such a system is distributed by the Foster Group of BF Goodrich Aerospace, 7020 Huntley Road, Columbus, Ohio 43229, as Stormscope Series II.

SUMMARY OF THE INVENTION (1) Progressive Contribution to the Art

This invention is particularly designed to provide a cellular system for aircraft. Part of this invention is also equally suitable for automobiles. One of the problems with aircraft, of course, is their rapid movement and because of their altitude, their substantially equal distance between several cells. This substantially equal distance to numerous cells, together with the lack of obstacles to the radio waves, produces a strong radio signal at numerous ground cell sites. Thus the radio signal would cause more interference than signals from mobiles in other cells on the ground.

Basically this is solved for aircraft by having vertically directional antennae on the towers or stationary transmitters so as to direct their beams at above ground level. In addition, or as a separate distinct alternative, directional antennas may be employed on the aircraft to reduce interference to and from other cells. For example, if the transmission is designed to direct a beam so that there is a minimum interference with the ground and also so that it will reach aircraft for many miles, then an air effective transmission range of about 150 miles may be obtained for each tower. This would mean that the cells could be approximately 300 miles in diameter. The large cell diameter would reduce the problem of rapid movement of the aircraft from one cell to the other.

To solve the problem of the transmission from the aircraft interfering with ground reception receivers, it is desirable to reduce the transmission power of the aircraft so that the power output is substantially lower than the power output from any ground vehicle mobile station. When the aircraft radio transmission power is sufficiently lower the power received by the base receivers from aircraft would be below that of any ground vehicles. In addition, the reception antennae on the ground for the aircraft may be designed to be particularly directional and high gain so that they can receive the very weak signals. Also, since they are pointed skyward, they would be directional skyward and not pick up the ground vehicles but would also be very selective in their reception of aircraft. Both the transmission and reception antennae at the base station have this highly directional characteristic to achieve this result.

Another means of reducing the reception of automobile transmission at the tower is by a different orientation of antenna. This produces a radio wave with different polarization of the electro-magnetic field. I.e., the cellular systems in common use today use vertical antennae both on the towers and on the mobile stations or ground vehicles. Therefore if horizontal antennae were used for transmission and reception both at the base station and the aircraft, the base antenna would be less effectively coupled to the automobile vertical antenna; also the reception of the aircraft transmissions would be better because of the advantages of having the transmitting and reception antenna similarly oriented. Likewise the reception of ground transmissions by the base is stronger because both base and mobile vehicles have antennae in a vertical orientation.

Therefore one embodiment of this invention uses horizontal antennae for transmissions and receptions to aircraft and vertical antennae for transmissions and receptions to automobiles.

Several methods of attenuation of the transmission power from the aircraft are well known to the art. Also, the nature of the aircraft itself is such that it is desirable not to have large antenna projecting from the skin of the aircraft which increase drag or affect the airworthiness of the aircraft. Arrangements are well known in the art to reduce power transmission from the aircraft but not reduce received signals. In any event, the coupling of the transmitter to the antenna can be adjusted to further reduce the efficiency of power transmission from the transmitter to the antenna.

The system basically is completely compatible with the ground system. I.e., each of the mobile stations transmits an identification code so that the signal strength of the identification code can be used to determine which base antenna would be in communication and control of the mobile station. Also, the control could be transferred from one antenna to the other in a similar fashion.

In addition to this, however, aircraft often have features which would be desirably incorporated into the cellular communication system, one feature being Loran location. Many aircraft have Loran positioning equipment. This Loran positioning equipment is well known to the art and can determine the location of the aircraft with extreme accuracy for the purposes herein required. Therefore, it is a portion of this invention that the aircraft would transmit the Loran information to the ground stations so that the transfer of the control from one tower to another could be readily accomplished by position of the mobile station, at least in part. The Loran-provided data would be transmitted as a packet of data in a very brief pulse over the channel then in use by the aircraft transmitter. One system would be that the mobile station would remain under the control of one base station until the signal strength became too weak or its position is close to another base station, then the control would be passed off to another base station; the base station to which the mobile station would be transferred to would be determined solely by the location of the mobile station unless there were some overriding consideration, such as if for some reason the reception between the mobile station and the selected first target base station proved to be so poor that it was below minimum quality. In such a case, other base stations would be tested to determine the one with the best signal. In addition, from the position of the mobile station at different times, the direction of travel of the mobile station could be easily determined and this direction of travel, if maintained, would lead to aircraft location, which would be within the control of an acceptable base station for an extended period of time. Therefore the control might be transferred to such a base station that would have extended control, even though other indications might be that it would be slightly better on a temporary basis of radio signal strength alone to be controlled by another tower.

It will be understood that the reception of the Loran transmissions would have to be in the mobile station. However, the data could be either interpreted in the mobile station and transmitted as latitude and longitude to the base stations, or it could be transmitted in the uninterpreted condition to the base stations and the transformation of the raw data into longitude and latitude could be done by equipment on the ground rather than on the mobile vehicle.

It will be understood, of course, that what has been said as to the Loran location and the transfer of the mobile station by Loran position would be equally applicable to ground vehicles and ground cellular systems, which is to say, just as applicable to automobiles as it is to aircraft. Further, other precision location equipment for systems such as GPS Satellite could be used instead of Loran equipment.

(2) Objects of this Invention

An object of this invention is to make cellular communications available to aircraft.

Another object of this invention is to improve cellular communications to all mobile stations.

Another object is to accomplish the above with the prevention of harmful radio interference.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

Figure 1:
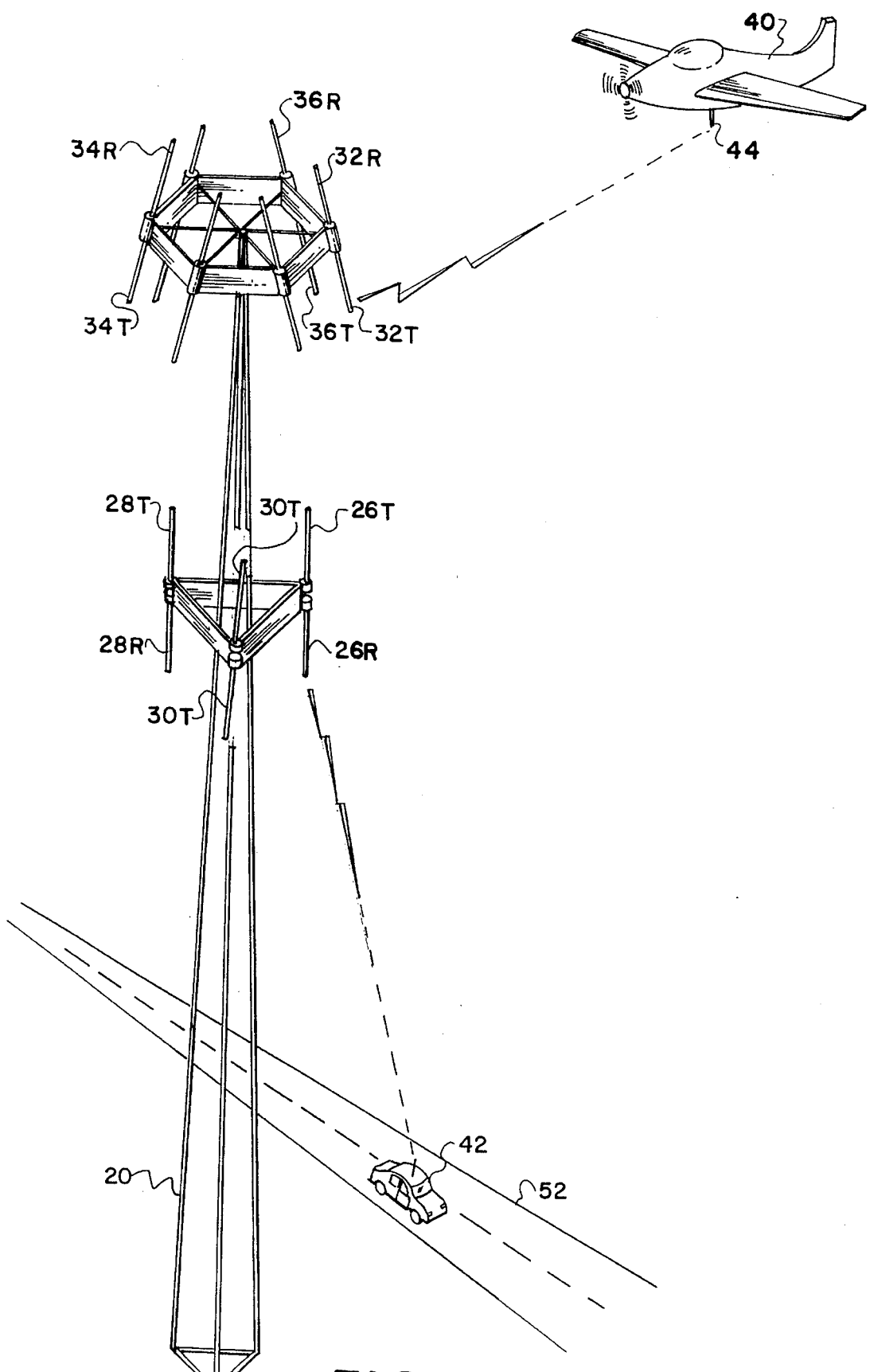
FIG. 1 is a schematic or pictorial representation of a tower having a first antenna array suitable for transmission to ground vehicles and a second antenna array suitable for transmission to aircraft.

As an aid to correlating the terms of the claims to the exemplary drawing(s), the following catalog of elements and steps is provided:

| 10 | cell |
| --- | --- |
| 12 | cell |
| 14 | cell |
| 16 | cell |
| 18 | cell |
| 20 | A-tower or Base Station |
| 22 | B-tower or Base Station |
| 24 | C-tower or Base Station |
| 26R | ground antenna |
| 26T | ground antenna |
| 28R | ground antenna |
| 28T | ground antenna |
| 30R | ground antenna |
| 30T | ground antenna |
| 32R | air antenna |
| 32T | air antenna |
| 34R | air antenna |
| 34T | air antenna |
| 36R | air antenna |
| 36T | air antenna |
| 38 | MSC |
| 40 | A-C Aircraft |
| 42 | Ground Vehicle |
| 44 | antenna |
| 46 | Master Loran |

| | |
|---|---|
| 48 | Slave Loran |
| 50 | Slave Loran |

DESCRIPTION OF THE PREFERRED EMBODIMENTS

Referring to the drawing there may be seen a structure for the cellular system. Specifically there may be seen a plurality of cells. For example, cells 10, 12, 14, 16, and 18. As may be seen in FIG. 2 there will be many additional cells which have not yet been designated. Each of these cells would have, for example, a tower which might be identified as A-tower 20, B-tower 22, and C-tower 24. A closer examination of the tower would show that each of the towers were located near or proximate the center of the cell. Although the term tower is used, antennae on buildings or platforms or other support structures are also within the technology of this invention.

The tower shown as tower A is shown with ground antenna 26R for receiving and 26T for transmitting, 28R and 28T, and 30R and 30T for transmitting and reception to ground vehicles. Also, each of the towers is shown with air antennae of which three have been identified as air antenna 32R and 32T, air antenna 34R and 34T, and 36R and 36T.

It is preferred that there be six or more air antennae, with interaction between the air antennae, because each of them is highly directional and therefore more sensitive in the direction to which they face. Those with ordinary skill in the art will understand how to make the air antennae highly directional or sensitive in a particular direction. In some cases, in addition to having the six antennae, each one with an approximate 60 degree area of sensitivity, it is desirable to use additional antennae to provide complete coverage of each sector. However, the use of multiple antennae and their arrangements for having their power directed in one direction is well known to the art and not a part of this invention, except to note that the air antennae would be directional for two reasons. One, so that they would not interfere with any ground signals as would be transmitted and received by antennae 26, 28, and 30, but second, so that they would extend and have a receivable signal and a signal reception at a large radius such as 150 miles.

It will also be noted that the air antennae 32, 34, 36, etc., have been shown as not being vertical but as angled relative to vertical so that the beam or air radiation pattern from these transmissions would be directed upward toward aircraft and would be directed away from the surface of the earth. Those skilled in the art will understand there are other ways to achieve directional radiation without tilting the antennae. Indeed, the FIG. 1 is meant to be a visual illustration that the radiation is directed upward and is not intended to show either the preferred or actual method of accomplishing the directional radiation.

Figure 3:
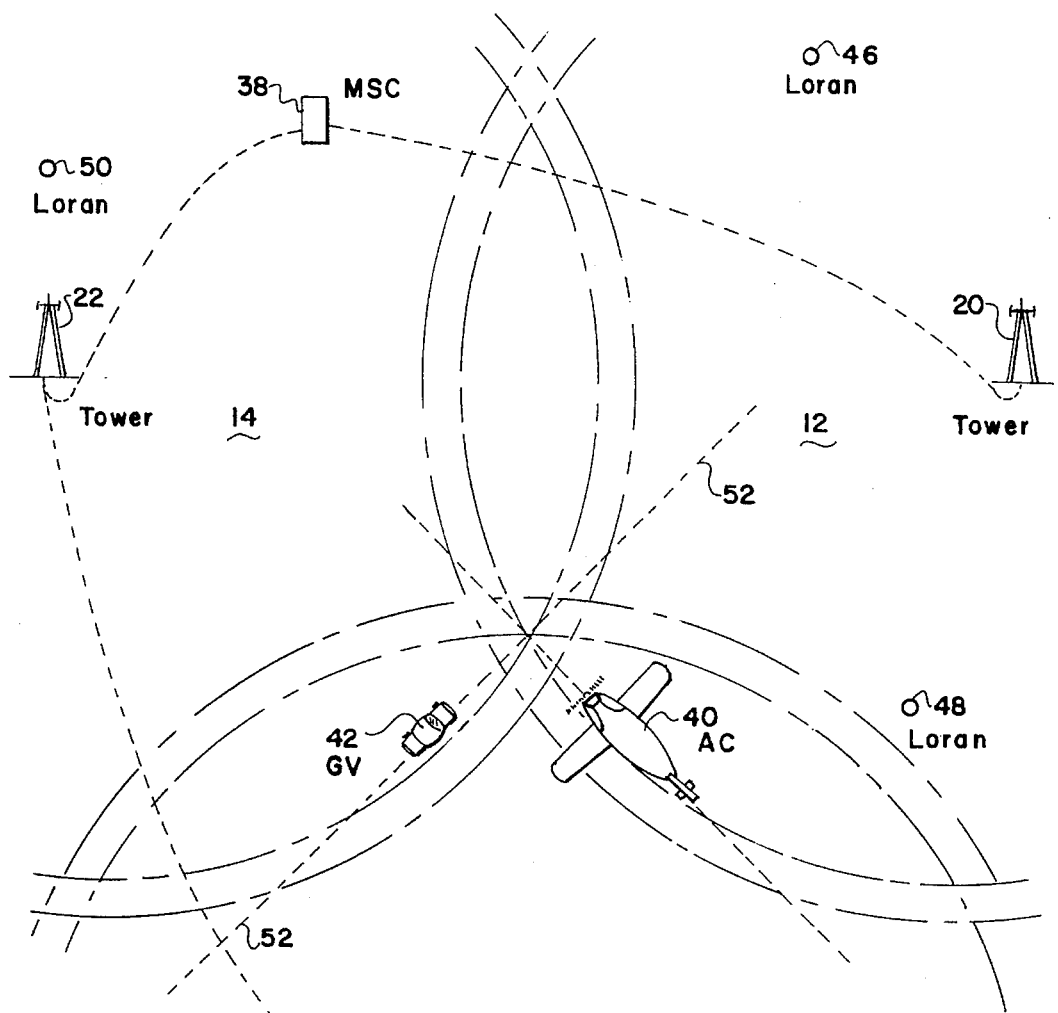
FIG. 3 is a schematical representation of a Loran system showing master and slave transmission stations with possible location of an aircraft or ground vehicle and likewise a location of three typical towers schematically shown which could be transmitting to the aircraft or automobile.
Figure 2:
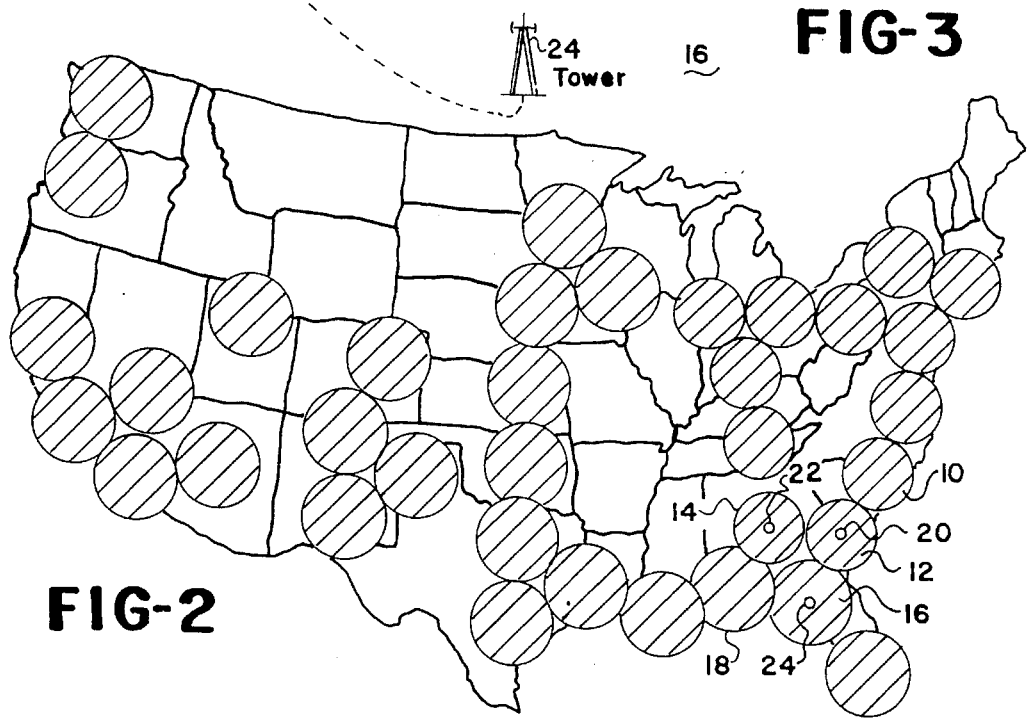
FIG. 2 is a schematic representation of the map of the United States with typical locations of cells which would suitable for aircraft.

Looking at the FIG. 2 it may be seen that with the air cells 10, 12, 14, 16, and 18 that each of the cells has a border between that cell and an adjacent cell. As shown in FIG. 3 the towers are all connected to mobile switching center 38 so the control of the different mobile stations such as that found in aircraft 40 can be controlled by the same equipment, etc., as used to control ground vehicle 42. It will be understood that normally the ground vehicle 42 would be an automobile although it could just as well be a hand-held mobile station, or it could also be, of course, mounted in a boat. Regardless of the type of vehicle, in each case the ground vehicle will be on the surface of the ground and not above the surface of the ground. Also, of course the aircraft 40 could be aircraft such as balloons, dirigibles, helicopters, or other non-conventional aircraft.

As described to this point it will be understood that the communication system to the aircraft would use conventional ground equipment except as specifically described otherwise. I.e., the tower antennae would be different inasmuch as they would be highly directional and also mounted to transmit their signals at a slight angle, for example a few degrees above the horizon, so as not to interfere with ground transmissions. That is to say, the aircraft radiation pattern would be at a higher elevation than the elevation of the land radiation pattern for the land vehicles. Also the tower antennae would be extremely directional and sensitive. The equipment in the aircraft 40 could be conventional with the exception of having an antenna designed such that the signal transmission from the aircraft would not interfere with and not be received by the tower ground antenna 26, 28, and 30. In addition, the coupling from the transmitter within the aircraft to the antenna may be made to attenuate the transmission even further if this were necessary to prevent interference to the ground towers.

The identification of mobile stations such as aircraft 40 would be identical regarding the identification and switching from tower to tower as for ground vehicles. The aircraft mobile stations would have identifications as such communications would always be directed to air antennae 32, 34, and 36. I.e., basically there need be no modification of the equipment within the mobile switching center 38. Also, of course, the size of the air cells or the cells for aircraft would be much larger and the spacing of towers would be typically approximately 300 miles apart rather than the much shorter spacing of typical towers for ground cellular systems.

Figure 4:
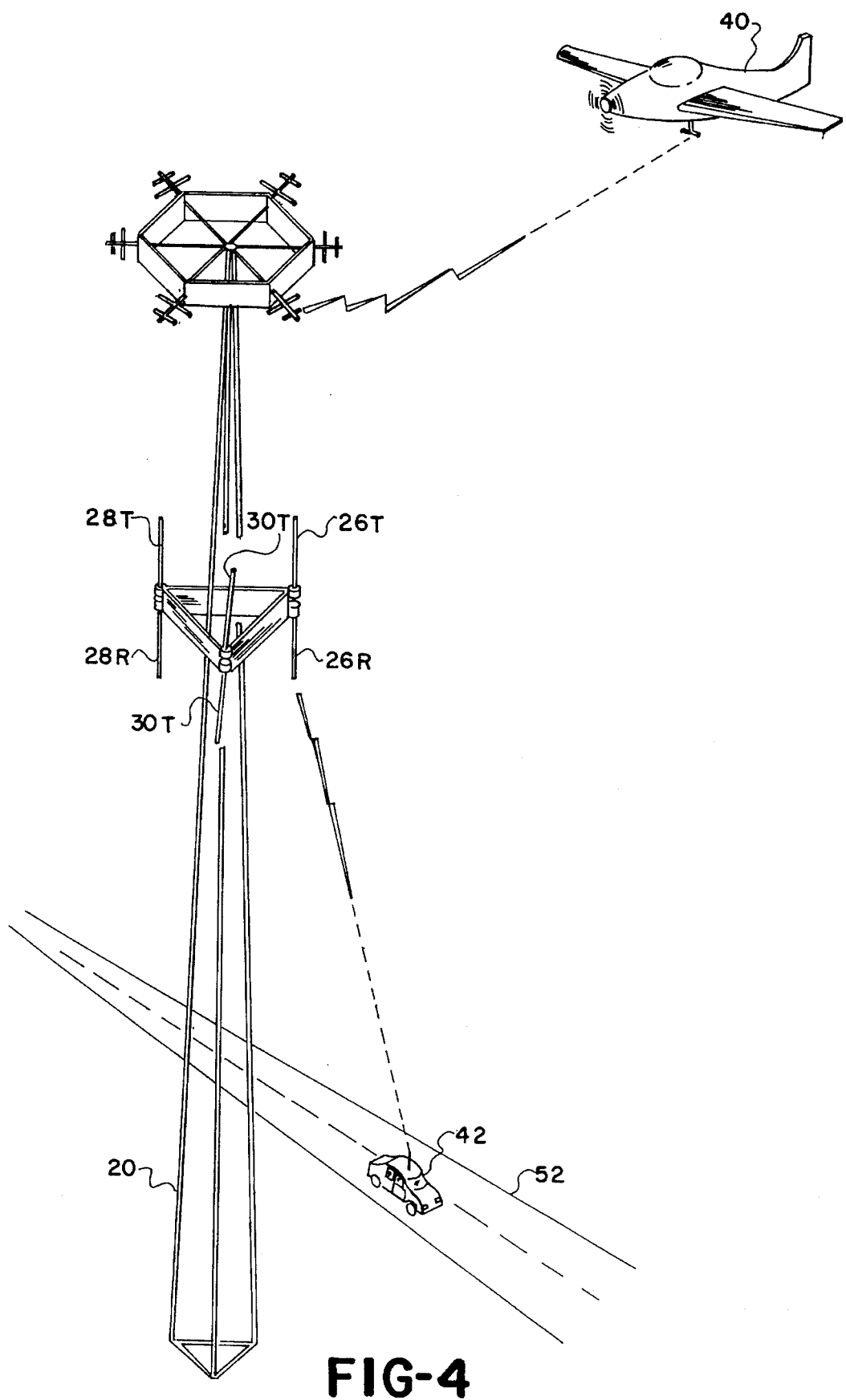
FIG. 4 is a schematic representation of a second embodiment of a tower having a first vertical antenna array suitable for transmission to ground vehicles and a second horizontal antenna array suitable for transmission to aircraft.

Referring to FIG. 4 there is shown another embodiment or modification. In this case, the aircraft antenna, both mounted on the aircraft and mounted upon the tower would use horizontal antennae. Since both the tower antennae and the aircraft antennae would be horizontal they would be well coupled, one to the other. However, the aircraft antennae would not be well coupled to the tower ground antenna, such as 26R, because one would be vertical and the other horizontal. Likewise the transmissions from the tower to aircraft would not be well received by automobiles because of this diversity in polarization.

Another modification for air systems would include use of the location of the aircraft. Methods of determining precision location of mobile vehicles are well known at the present time. One type in wide use is having master Loran transmitter 46 and slave Loran transmitters 48 and 50. Although a very elementary system has been sketched, it will be understood that in many cases a much more sophisticated network would be used so that there would more checks for the system to pinpoint the location of the mobile station whether it be the aircraft 40 or ground vehicle 42. Once the mobile station had the Loran receivers the information as received could be transmitted as packets of information to the towers or stationary receivers and therefore the mobile switching center could know the latitude and longitude of the mobile station with accuracy. This would be true whether the aircraft translated the raw data as received by the Loran receivers by a microprocessor aboard the aircraft, or whether this was the information packets as transmitted to the tower as interpreted data or raw data. In any event, this information would be available to the mobile switching center 38. Then the equipment within the mobile switching center could have additional information to control the switching as discussed above. I.e, it could be done on a purely geographic basis. I.e., each cell would have its geographic boundaries, and as soon as the mobile station left the boundaries of one cell and entered that of another the control and transmission of mobile telephone communications would likewise be transferred. This could be considered a pure position transfer. Of course, with modern technology there could be other considerations for the transfer, not the least of which would be that the direction of travel of the mobile station could be readily be determined and therefore the direction of travel or pattern of movement relative to two competing cells could be determined. This information would determine which cell would be in control, i.e., based upon the direction of travel, which of the cells would have the mobile station within its range for the longer period of time.

Although this would be very useful for air travel, also because of certain geographic or topographic conditions on the ground, this would be desirable for ground vehicles as well. I.e., many ground vehicles travel along expressways, many of which are located in natural or artificial gullies or ravines. Therefore they both travel at rather high speeds and also have particular problems with receptions from certain cells. For this reason, their control by location in many cases would be highly desirable.

Also, the precise location as determined by a navigational system together with the ground communications have many additional advantages. For example, there are commercially available navigational and weather aids such as those identified above as Stormscope. Thus through the established communication links available by the cellular voice channels that weather data could be supplied for the vicinity of the precise location of the aircraft. Even without the precise location of the aircraft, the weather for the vicinity (e.g. cell) of the base station could be given. Several different arrangements would be available. For example, the aircraft could readily call a telephone number supplied by the navigational aid provider so that as soon as the telephone connection was made the data provider would immediately determine the location of the aircraft and therefore could provide first the weather data for that area. In addition, of course, it could give navigational aid. The navigational aid could be in several formats. It could either direct the aircraft how to avoid adverse weather and continue on to its desired location or it could provide the aircraft with the locations and direction to the nearest airport which was clear of adverse weather in the event the aircraft decided to abort its flight. Even without the precise location of the aircraft, graphic navigational data within the cell could be given.

Since the information providing navigational information and weather data for a precise location are already developed the details of such will not be explained here but references made to the identification of such found in the discussion of the related art above.

Also, of course, this weather data and navigational data could be provided in various formats. Many aircraft are already provided with facsimile receivers so that the information could be sent in standard facsimile format to provide data in graphic form on paper in the aircraft. Other aircraft are provided with oscilloscopes so that the weather or navigation information and data could be shown in graphic form on the oscilloscopes.

Further it will be understood that the precise location as well as additional information such as altitude could be coded and sent by packets to aircraft controllers at airports.

The embodiments shown and described above are only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention, The limits of the invention and the bounds of the patent protection are measured by and defined in the following claims.

We claim as our invention:

1. A structural cellular telephone system using a designated plurality of radio channels, some of the channels being control channels and some of the channels being voice channels, said system having
    a) a plurality of cells, each cell having a base station including a tower located proximate a center thereof,
    b) each base station equipped to simultaneously transmit and receive on the plurality of voice channels, and at least one control channel,
    c) a plurality of mobile stations operating within the cells,
    d) each mobile station being equipped to transmit and receive on some of the channels, and
    e) at least one mobile switching center connected to each of said base stations,
    f) said mobile switching centers including means for switching any of the mobile stations from one cell to another,
    g) each of the mobile stations being equipped to receive instructions from the base stations to determine selections of said channels,
  wherein the improvement comprises:
    h) some of the mobile stations being on aircraft and some of the mobile stations being on land vehicles,
    i) some of said base stations having an air capability to transmit and receive signals on the channels in an aircraft horizontal polarized radiation,
    j) all said base stations having capability to transmit and receive signals on the channels in a land vertical polarized radiation,
    l) the voice channels to be used for aircraft horizontal polarized radiation selected from all of the voice channels, and the voice channels to be used for land vertical polarized radiation selected from all of the voice channels,
    m) each of the cells having a land effective transmission range from the base station,
    n) all cells having a base station having said air capability having an air effective transmission range which is greater than the land effective transmission range of all cells.

2. In a method of operating a cellular telephone system of the type having a designated plurality of radio channels, some of the channels being control channels and some of the channels being voice channels for mobile stations,
    a) a plurality of cells, each cell having a base station including a tower located proximate a center thereof,
    b) each base station equipped to simultaneously transmit and receive on a plurality of voice channels, and at least one control channel,
    c) a plurality of mobile stations operating within the cells,
    d) each mobile station capable of transmitting and receiving upon some of the channels, and
    e) at least one mobile switching center connected to each of said base stations, f) said mobile switching centers including means for switching any of the mobile stations from one cell to another, g) each of the mobile stations being capable of receiving instructions from the base stations to determine the selection of channels, wherein the improved method comprises:

h) transmitting and receiving land signals in a land radiation pattern at a land elevation having a land effective transmission range upon a set of voice channels selected from all said voice channels to land mobile stations from the base stations, j) transmitting land signals from the land mobile stations on land vehicles to the base stations at a land power output, k) transmitting and receiving air signals in an aircraft radiation pattern at an air elevation having an aircraft effective transmission range upon a set of voice channels selected from all said voice channels to air mobile stations from at least one of the base stations, l) transmitting air signals from air mobile stations on aircraft to the base station at an air power output which is substantially lower than any said land power output, m) said aircraft radiation pattern elevation being higher than the elevation of said land radiation pattern, and n) said aircraft effective transmission range being greater than the land effective transmission range.

3. The method as defined in claim 2 further comprising:

o) said air mobile station and said base stations transmitting all air signals with horizontal polarized radiation.

4. A structural cellular telephone system using a designated plurality of radio channels, some of the channels being control channels and some of the channels being voice channels, said system having a) a plurality of cells, each cell having a base station including a tower located proximate a center thereof, b) each base station equipped to simultaneously transmit and receive a plurality of voice channels, and at least one control channel, c) a plurality of mobile stations operating within the cells, d) each mobile station being equipped to transmit and receive on some of the channels, and e) at least one mobile switching center connected to each of said base stations, f) said mobile switching centers including means for switching any of the mobile stations from one cell to another, g) each of the mobile stations being equipped to receive instructions from the base stations to determine selections of said channels, wherein the improvement comprises:

h) some of the mobile stations being on aircraft and some of the mobile stations being on land vehicles, i) all said base stations having a land capability to transmit and receive signals on the channels in a land radiation pattern, j) some of said base stations having an air capability to transmit and receive signals on the channels in an aircraft radiation pattern, k) said aircraft radiation pattern being at a higher elevation than the elevation of said land radiation pattern, l) the voice channels to be used for the aircraft radiation pattern selected from all of the voice channels, and the voice channels to be used for the land radiation pattern selected from all of the voice channels, m) all cells having land effective transmission range from the base station, n) all cells having a base station having said air capability having an air effective transmission range which is greater than the land effective transmission range of all cells, o) said base stations having said air capability also having the capability of transmitting an aircraft horizontally polarized radiation and all said base stations having the capability of a land vertical polarized radiation.

5. The structural cellular system defined in claim 4 further comprising:

p) said mobile stations on aircraft have a transmission power output which is substantially lower than the transmission power output of a mobile stations on land vehicles.

\* \* \* \* \*